(12) United States Patent
Tanaka

(10) Patent No.: US 10,306,109 B2
(45) Date of Patent: May 28, 2019

(54) IMAGE FORMING APPARATUS AND CONTROL METHOD THEREFOR

(71) Applicant: CANON KABUSHIKI KAISHA, Tokyo (JP)

(72) Inventor: Sumito Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/927,962

(22) Filed: Oct. 30, 2015

(65) Prior Publication Data

US 2016/0050339 A1 Feb. 18, 2016

Related U.S. Application Data

(63) Continuation of application No. 13/104,302, filed on May 10, 2011, now abandoned.

(30) Foreign Application Priority Data

May 14, 2010 (JP) .................. 2010-112665

(51) Int. Cl.
- *H04N 1/40* (2006.01)
- *G03G 15/00* (2006.01)
- *H04N 1/407* (2006.01)

(52) U.S. Cl.
CPC ....... *H04N 1/4078* (2013.01); *G03G 15/5041* (2013.01); *H04N 1/40037* (2013.01); *H04N 2201/0082* (2013.01)

(58) Field of Classification Search
CPC ............. H04N 1/4078; H04N 1/40037; H04N 2201/0082; G03G 15/5041
(Continued)

(56) References Cited

U.S. PATENT DOCUMENTS

| 5,528,339 A | 6/1996 | Buhr et al. |
| 5,633,669 A | 5/1997 | Hada et al. |

(Continued)

FOREIGN PATENT DOCUMENTS

| CN | 1645267 A | 7/2005 |
| JP | 09-146313 A | 6/1997 |
| JP | 2000-238341 A | 9/2000 |
| JP | 2005140917 A | 6/2005 |
| JP | 2008197547 A | 8/2008 |

(Continued)

OTHER PUBLICATIONS

Extended European Search Report issued in EP 11163116.4 dated Jul. 1, 2011.

(Continued)

*Primary Examiner* — Neil R McLean
*Assistant Examiner* — Darryl V Dottin
(74) *Attorney, Agent, or Firm* — Rossi, Kimms & McDowell LLP

(57) ABSTRACT

An image forming apparatus can reduce degradation of the line quality in an output image by a simple method while maintaining the stability of the density characteristics of the output image, and a control method therefor. To accomplish this, in accordance with the amount of change, from a reference density value, of a density value measured from a test pattern image formed on a photosensitive drum, the image forming apparatus according to the invention creates LUT_2 for correcting a laser output signal value corrected using γ correction LUT_1. The image forming apparatus performs γ correction using LUT_1 and LUT_2 for developing colors other than a predetermined low-brightness developing color, whereas for the predetermined low-bright- (Continued)

ness developing color, it performs γ correction using LUT_1 and laser light amount correction instead of γ correction using LUT_2.

12 Claims, 8 Drawing Sheets

(58) Field of Classification Search
USPC .......................................................... 358/1.16
See application file for complete search history.

(56) References Cited

U.S. PATENT DOCUMENTS

| | | | |
|---|---|---|---|
| 5,761,573 | A | 6/1998 | Haneda et al. |
| 6,006,010 | A | 12/1999 | Hada et al. |
| 6,064,848 | A | 5/2000 | Haneda |
| 6,288,733 | B1 | 9/2001 | Nakazawa et al. |
| 6,418,281 | B1 | 7/2002 | Ohki |
| 2002/0033878 | A1 | 3/2002 | Satoh et al. |
| 2004/0109176 | A1* | 6/2004 | Osari ............... G06K 15/02 358/1.2 |
| 2004/0209178 | A1 | 10/2004 | Itakura et al. |
| 2005/0175365 | A1 | 8/2005 | Gomi |
| 2006/0222389 | A1* | 10/2006 | Kin ............... G03G 15/0131 399/49 |
| 2007/0041060 | A1* | 2/2007 | Kikuchi ............ H04N 1/40006 358/504 |

FOREIGN PATENT DOCUMENTS

| | | |
|---|---|---|
| JP | 2008292925 A | 12/2008 |
| JP | 2010020061 A | 1/2010 |

OTHER PUBLICATIONS

Chinese Office Action dated Jul. 1, 2013 in CN 201110125983.8.
Japanese Office Action issued in Japanese application No. JP2014139156, dated Jun. 26, 2015.
Non-Final Office Action issued in U.S. Appl. No. 13/104,302, dated Apr. 1, 2013.
Final Office Action issued in U.S. Appl. No. 13/104,302, dated Aug. 26, 2013.
Non-Final Office Action issued in U.S. Appl. No. 13/104,302, dated Jun. 4, 2014.
Final Office Action issued in U.S. Appl. No. 13/104,302, dated Jan. 26, 2015.
Non-Final Office Action issued in U.S. Appl. No. 13/104,302, dated Jul. 31, 2015.

* cited by examiner

IMAGE FORMING APPARATUS AND CONTROL METHOD THEREFOR

BACKGROUND OF THE INVENTION

Field of the Invention

The present invention relates to an image forming apparatus and control method therefor.

Description of the Related Art

An image forming apparatus is generally known to change the quality of an output image formed on a printing medium upon a change of environmental conditions such as the temperature and humidity. An electrophotographic image forming apparatus is known to change the quality of an output image along with deterioration of consumables including a photosensitive drum, toner cartridge, and toner, and the like.

Coping with the change of the quality of an output image and adjusting the quality to a desired characteristic require calibration for adjusting image forming conditions. For example, Japanese Patent Laid-Open No. 2000-238341 discloses a method of generating a lookup table (LUT) for performing density correction or tone correction (γ correction) by reading a test pattern image formed on printing paper. According to this method, a reference density value is determined by measuring the density of a toner image formed on a photosensitive drum in accordance with a generated LUT. The LUT is then corrected based on the result of a comparison between the reference density value and a density value obtained by measuring a toner image formed again on the photosensitive drum at a predetermined time. The stability of image density characteristics can therefore be maintained for a long term.

Japanese Patent Laid-Open No. 09-146313 discloses a method of executing, as calibrations in an image forming apparatus, maximum density correction and γ correction every time printing is done for a predetermined number of sheets, and also executing line width control to adjust the line width by changing the laser exposure amount. According to this method, γ correction is executed after performing line width control and maximum density correction in order not to change, by line width control and maximum density correction, density characteristics corrected by γ correction. A light-emitting element and light-receiving element are arranged to detect a line image or the like formed on an image carrier for line width adjustment. Based on the detection result, line width control is executed.

In γ correction according to Japanese Patent Laid-Open No. 2000-238341, when the density of a toner image formed on a photosensitive drum is higher than the reference density value, the LUT is corrected to decrease a laser output signal value used to perform normal image formation. In this case, especially when a laser output signal value corresponding to high density level is decreased, a character or line may be disconnected in an output image formed on a printing medium depending on the degree of decrease, generating a jaggy. The jaggy of the output image stands out particularly when the image is output using a low-brightness developing material. Although the stability of density characteristics in the output image can be maintained, the quality of the output image may degrade due to degradation of the line quality. To reduce the degradation of the quality of the output image, it is desirable to appropriately adjust the line width.

However, line width control according to the method in Japanese Patent Laid-Open No. 09-146313 requires a light-emitting element and light-receiving element to detect an adjustment test pattern image formed on the image carrier. Hence, additional hardware and processing are needed.

SUMMARY OF THE INVENTION

The present invention has been made to overcome the conventional drawbacks, and provides an image forming apparatus which reduces degradation of the line quality in an output image by a simple method while maintaining the stability of the density characteristics of the output image.

One aspect of the present invention provides an image forming apparatus including an image forming unit including an image carrier, an exposure unit that exposes the image carrier in accordance with an image signal to form an electrostatic latent image on the image carrier, and a developing unit that develops the electrostatic latent image formed on the image carrier using a developing material to form a developing material image on the image carrier, and a transfer unit that transfers the developing material image formed on the image carrier onto printing paper to form an image on the printing paper, the apparatus comprising: a storage unit that stores correction data used in γ correction for correcting density characteristics of an image to be formed on printing paper by the image forming unit and the transfer unit, and a reference density value used when creating modification data for modifying a value of the image signal corrected using the correction data; a pattern forming unit that forms a test pattern image on the image carrier using the image forming unit by applying the γ correction using the correction data; a measurement unit that measures a density value of the test pattern image formed on the image carrier by the pattern forming unit; a creation unit that creates the modification data in accordance with an amount of density change, from the reference density value stored in the storage unit, of the density value of the test pattern image that is measured by the measurement unit; and a correction unit that, for a developing color other than a low-brightness developing color being lower in brightness than a predetermined value, performs the γ correction using the correction data and the modification data, and for the low-brightness developing color, performs the γ correction using the correction data and light amount correction for correcting an exposure amount of the exposure unit in accordance with the amount of density change.

Another aspect of the present invention provides a method for controlling an image forming apparatus including an image forming unit including an image carrier, an exposure unit that exposes the image carrier in accordance with an image signal to form an electrostatic latent image on the image carrier, and a developing unit that develops the electrostatic latent image formed on the image carrier using a developing material to form a developing material image on the image carrier, a transfer unit that transfers the developing material image formed on the image carrier onto printing paper to form an image on the printing paper, and a storage unit that stores correction data used in γ correction for correcting density characteristics of an image to be formed on printing paper by the image forming unit and the transfer unit, and a reference density value used when creating modification data for modifying a value of the image signal corrected using the correction data, the method comprising: causing a pattern forming unit to form a test pattern image on the image carrier using the image forming unit by applying the γ correction using the correction data; causing a measurement unit to measure a density value of the test pattern image formed on the image carrier in the causing a pattern forming unit to form a test pattern image;

causing a creation unit to create the modification data in accordance with an amount of density change, from the reference density value stored in the storage unit, of the density value of the test pattern image that is measured in the causing a measurement unit to measure a density value; and causing a correction unit to, for a developing color other than a low-brightness developing color being lower in brightness than a predetermined value, perform the γ correction using the correction data and the modification data, and for the low-brightness developing color, perform the γ correction using the correction data and light amount correction for correcting an exposure amount of the exposure unit in accordance with the amount of density change.

The present invention can provide an image forming apparatus which reduces degradation of the line quality in an output image by a simple method while maintaining the stability of the density characteristics of the output image.

Further features of the present invention will become apparent from the following description of exemplary embodiments (with reference to the attached drawings).

DESCRIPTION OF THE EMBODIMENTS

Preferred embodiments of the present invention will be described below with reference to the accompanying drawings. The following embodiments are not intended to limit the invention of the scope of the appended claims, and not all combinations of features described in the embodiments are indispensable for the means of solving the problems in the invention.

First Embodiment

The first embodiment in the present invention will be described. In the embodiment, the present invention is applied to an electrophotographic color (multicolor) copying apparatus as an example of an image forming apparatus according to the present invention. However, the image forming apparatus according to the present invention may be a multi-function peripheral.

<Arrangement of Image Forming Apparatus>

Figure 1:
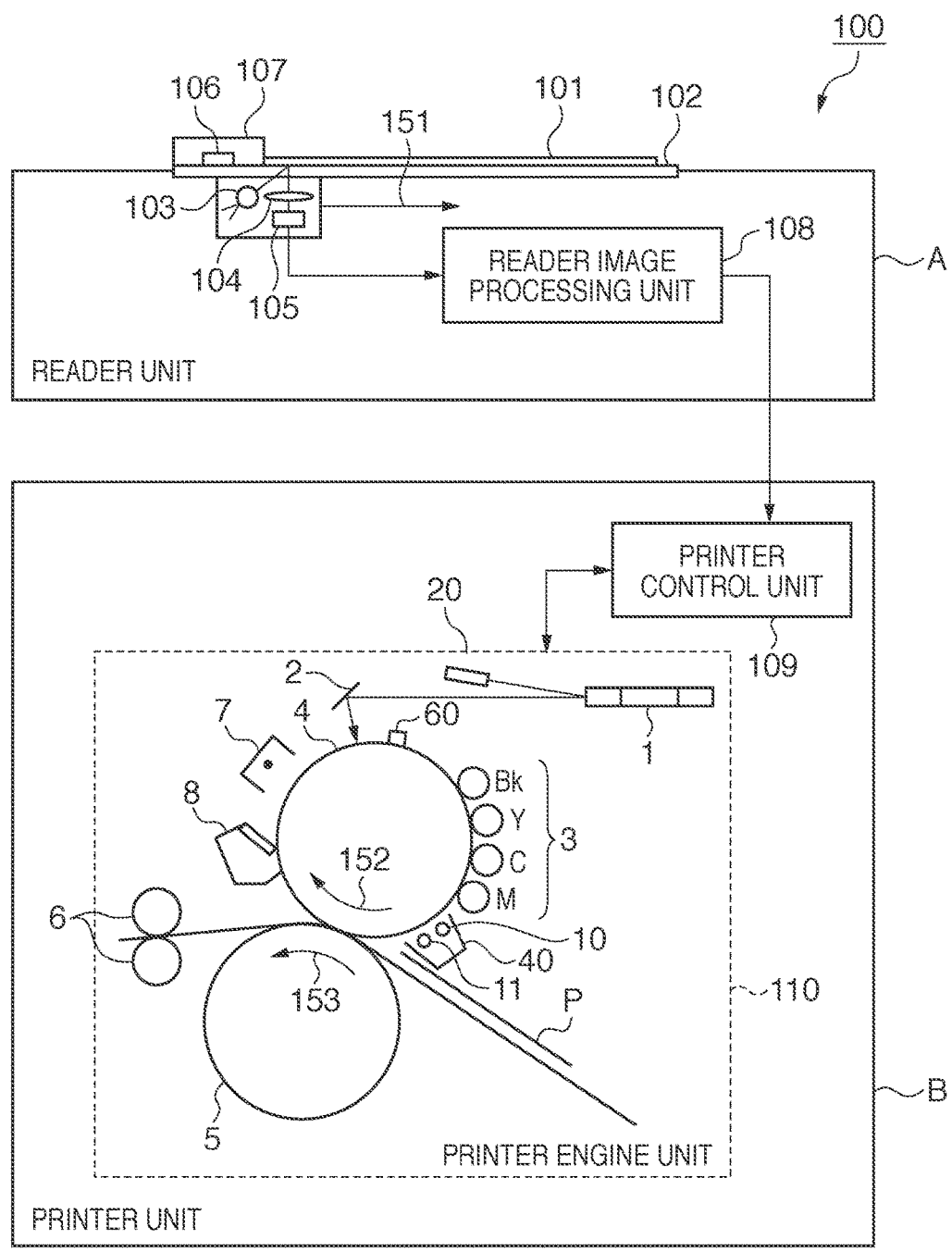
FIG. 1 is a schematic view showing the arrangement of a full-color copying apparatus 100 according to the first embodiment.

A full-color copying apparatus (to be simply referred to as a "copying apparatus") 100 shown in FIG. 1 is an example of the image forming apparatus according to the embodiment. The copying apparatus 100 roughly includes an image reading unit (reader unit A) which reads a document image and converts it into image data, and an image forming unit (printer unit B) which forms (prints) an image on a printing medium using image data. The copying apparatus 100 implements a copy function of printing an image read by the reader unit A on a printing medium by the printer unit B. Note that the copying apparatus 100 may have a printer function of printing, on a printing medium by the printer unit B, image data input from an external apparatus such as a PC via a network such as a LAN.

(Reader Unit A)

A light source 103 irradiates, with a laser beam, a document 101 set on a document glass 102 of the reader unit A. A CCD sensor 105 forms the light reflected by the document 101 into an image via an optical system 104. The CCD sensor 105 includes CCD line sensors arranged in three arrays corresponding to red, green, and blue, respectively. A reading optical system unit made up of the light source 103, optical system 104, and CCD sensor 105 reads the document 101 while moving in a direction indicated by an arrow 151 shown in FIG. 1. The CCD sensor 105 converts the image of the document 101 into an electrical signal data string (image signal) for each line.

A positioning member 107 and reference white board 106 are arranged on the document glass 102. The positioning member 107 makes one side of the document 101 abut against it to prevent a skew arrangement of the document 101. The reference white board 106 is used to determine the white level of the CCD sensor 105 and perform shading correction of the CCD sensor 105 in the thrust direction. An image signal (image data) output from the CCD sensor 105 undergoes image processing by a reader image processing unit 108, and is sent to a printer control unit 109 in the printer unit B.

(Printer Unit B)

The printer unit B roughly includes the printer control unit 109 and a printer engine unit 110. The printer engine unit 110 operates under the control of the printer control unit 109. In the printer engine unit 110, a primary charger 7 uniformly charges the surface of a photosensitive drum (image carrier) 4 which rotates in a direction indicated by an arrow 152. The printer control unit 109 outputs a pulse signal corresponding to input image data from a laser driver (27 in FIG. 2) to a laser light source 20. The laser light source 20 formed from a semiconductor laser emits a laser beam corresponding to the input pulse signal. The laser beam emitted by the laser light source 20 is reflected by a polygon mirror 1 and mirror 2, scanning the surface of the uniformly charged photosensitive drum 4. In this way, an exposure unit made up of the laser light source 20, polygon mirror 1, and mirror 2 exposes the photosensitive drum 4 in accordance with data input to the printer unit B as image data of an image to be formed on a printing medium. As a result, an electrostatic latent image is formed on the surface of the photosensitive drum 4.

Developing units 3 using two-component toners corresponding to black (Bk), yellow (Y), cyan (C), and magenta (M) are arranged near the photosensitive drum 4 sequentially from the upstream side in the rotational direction. The developing units 3 develop the electrostatic latent image formed on the surface of the photosensitive drum 4 using different color toners, thereby forming a toner image (developing material image) on the photosensitive drum 4.

Printing paper P serving as an example of the printing medium is wound around a transfer drum 5 which rotates in a direction indicated by an arrow 153. In this state, the printing paper P rotates a total of four times along with rotation of the transfer drum 5. In every rotation, each developing unit 3 transfers each toner image formed on the photosensitive drum 4 at the same position on the printing paper P in an overlapping manner. After the end of transferring respective toner images, the printing paper P is separated from the transfer drum 5, and sent to a fixing unit (pair of fixing rollers) 6. The toner images transferred on the printing paper P are fixed onto the printing paper P by the pair of fixing rollers 6. Accordingly, full-color printing on the printing paper P is completed.

A surface potential sensor 60 for measuring the surface potential of the photosensitive drum 4, and a cleaner 8 for removing toner left on the photosensitive drum 4 after transfer are arranged near the photosensitive drum 4 on the upstream side of the developing units 3. Also, a photosensor 40 is arranged near the photosensitive drum 4, and includes an LED light source 10 for irradiating, with light, toner patches formed on the photosensitive drum 4, and a photodiode 11 for detecting the reflected light amount.

<Control Mechanism of Image Forming Apparatus>

Figure 2:
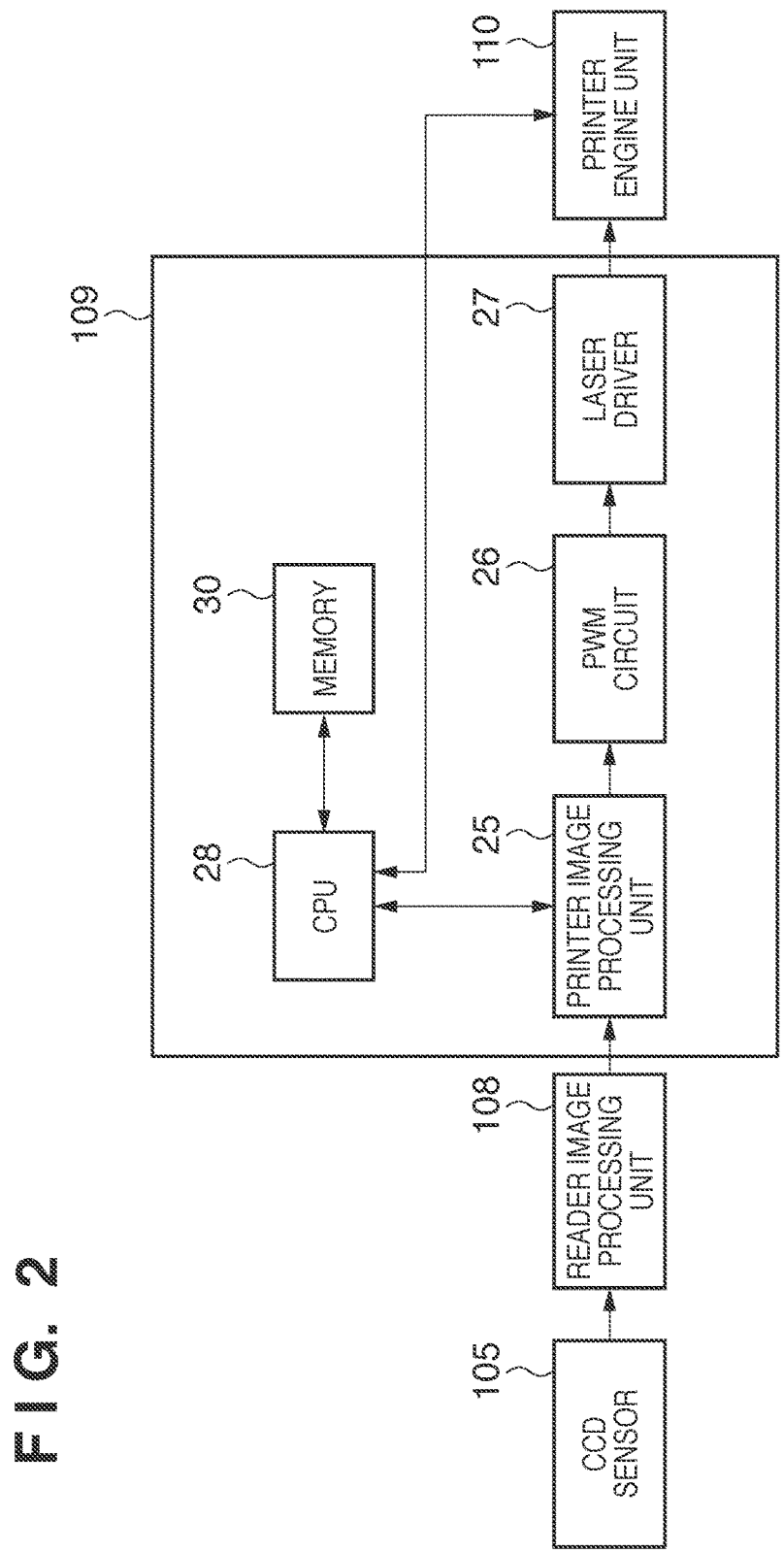
FIG. 2 is a block diagram showing the control mechanism of the full-color copying apparatus 100 according to the first embodiment.

The control mechanism of the copying apparatus 100 will be explained with reference to FIG. 2. The reader image processing unit 108 A/D-converts a signal from the CCD sensor 105. The reader image processing unit 108 performs γ correction, color processing, MTF correction, and the like, generating an image signal and outputting it to the printer control unit 109 of the printer unit B. The printer control unit 109 executes image processing (to be described later) for the image signal (image data) received from the reader image processing unit 108 of the reader unit A, and outputs the resultant signal to the printer engine unit 110. A CPU 28 of the printer control unit 109 controls the overall printer unit B including the printer control unit 109 and printer engine unit 110. The CPU 28 of the printer control unit 109 is connected to a memory 30 serving as a nonvolatile storage device.

In the printer control unit 109, a printer image processing unit 25 performs color processing, γ correction, and the like for an input image signal under the control of the CPU 28, generating a laser output signal and outputting it to a PWM circuit 26. Note that the CPU 28 mainly executes even calibration processing regarding the density characteristics (tone characteristics) of an image to be finally formed on printing paper. A lookup table (density correction characteristics) corresponding to correction data (to be described later) created by calibration is used to change the γ characteristic of an output in the printer unit B. The PWM circuit 26 outputs, to a laser driver 27, a signal PWM-modulated using the input laser output signal. The laser driver 27 causes the laser light source 20 of the printer engine unit 110 to emit light in accordance with the input signal. In this manner, the photosensitive drum 4 is exposed in accordance with the laser output signal.

For calibration in the present invention, there are two control systems. The first control system is a control system which has a relatively long execution interval, and execution of which is designated by a serviceman in, for example, installation work or periodic inspection work for the image forming apparatus. The second control system is a control system which has a relatively short execution interval, and is executed upon, for example, power-on of the image forming apparatus, once a day, or every printing of a predetermined number of sheets.

In the first control system, the printer unit B transfers and forms, on printing paper, a test pattern image. The reader unit A reads the test pattern image, and determines the density correction characteristics of the printer unit B. The memory 30 holds the density correction characteristics as a lookup table LUT_1. LUT_1 is used to convert an image signal (density signal) from the reader unit A into a laser output signal. Further, in the first control system, the toner image of a predetermined test pattern image is formed on the photosensitive drum 4 by applying LUT_1, and the photosensor 40 in the printer engine unit 110 measures the density of the toner image. The nonvolatile memory 30 stores a density value obtained by the measurement. The density value stored in the memory 30 serves as a target (reference density value) in the second control system.

In the second control system, the toner image of a predetermined test pattern image is formed on the photosensitive drum 4 by applying LUT_1, and the photosensor 40 measures the density value of the toner image. Further, a modification table LUT_2 for modifying LUT_1 is created based on the difference between the measured density value and the reference density value. LUT_2 is used to maintain the density and tone of an image by reflecting a change of the printer unit B over time in LUT_1. The first control system requires printing paper for creating LUT_1, whereas the second control system does not require printing paper. Also, the second control system need not set printing paper in the reader unit A and read it. In particular, the second control system is executed more frequently than the first control system. Hence, the burden of calibration on the user can be reduced, and the processing time can be shortened.

As calibration of the copying apparatus 100, in addition to the first control system, the second control system is executed at a time interval shorter than that of the first control system. Image density characteristics corrected by the first control system can be stably maintained for a long term. In the second control system, LUT_2 is created to decrease the laser output signal value (image signal value) in accordance with the density change amount when the density value of a toner image formed on the photosensitive drum 4 is changed to be higher than the reference density value. In this case, a character or line may be disconnected or jagged in an output image formed on printing paper depending on the degree of decrease in the laser output signal value in LUT_2, degrading the quality of the output image.

Figure 3:
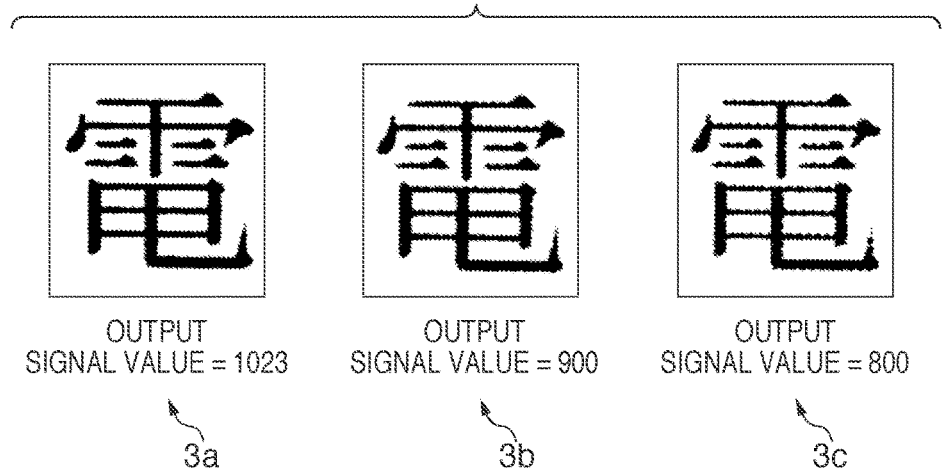
FIG. 3 is a view exemplifying characters respectively formed using different laser output signal values.

FIG. 3 exemplifies characters respectively formed using different laser output signal values. In FIGS. 3, 3a, 3b, and 3c represent characters formed on printing sheets in a 5-pt Times New Roman font using laser output signal values of 1023, 900, and 800 each expressed by 10 bits. Image forming conditions are adjusted in advance such that an image density (of an output) corresponding to a reference density level which defines a maximum density in the density characteristics of an output image, that is, generally corresponding to a density when forming a solid image becomes 1.6. As shown in FIG. 3, as the laser output signal value decreases, the line is disconnected much more and the contour of the character is jagged. This reveals that, even if the density of an output image is controlled to become constant, the quality of a character or line may degrade due to a decrease in laser output signal value along with calibration.

As an image signal for forming a character or line, an image signal of high density level is generally used. When the second control system decreases a laser output signal value corresponding to high density level, the density characteristics of an image finally formed on printing paper may be maintained, but the character or line quality readily degrades. Especially for a character or line, a developing color with relatively low brightness, such as black, is often used. A character or line formed using a low-brightness developing color has a high contrast with high-brightness printing paper used in general. For this reason, degradation of the character or line quality may stand out and attract user attention.

According to the embodiment, to reduce the degradation of the character or line quality, the second control system uses laser light amount correction in addition to tone correction (γ correction) using the above-mentioned LUT_2. In laser light amount correction, the exposure amount (laser power) used when the exposure unit exposes the photosensitive drum 4 to form an electrostatic latent image on the photosensitive drum 4 is corrected (adjusted). In the embodiment, when a laser output signal value in a high-density region in application of γ correction becomes smaller than a predetermined level, the second control system switches from γ correction to laser light amount correction to correct density characteristics. By correcting the exposure amount, the density characteristics of an output image can be corrected without decreasing the laser output signal value. As a consequence, correction of the density characteristics of an output image by the second control system can be implemented without a decrease in laser output signal which may degrade the line quality.

Figure 4:
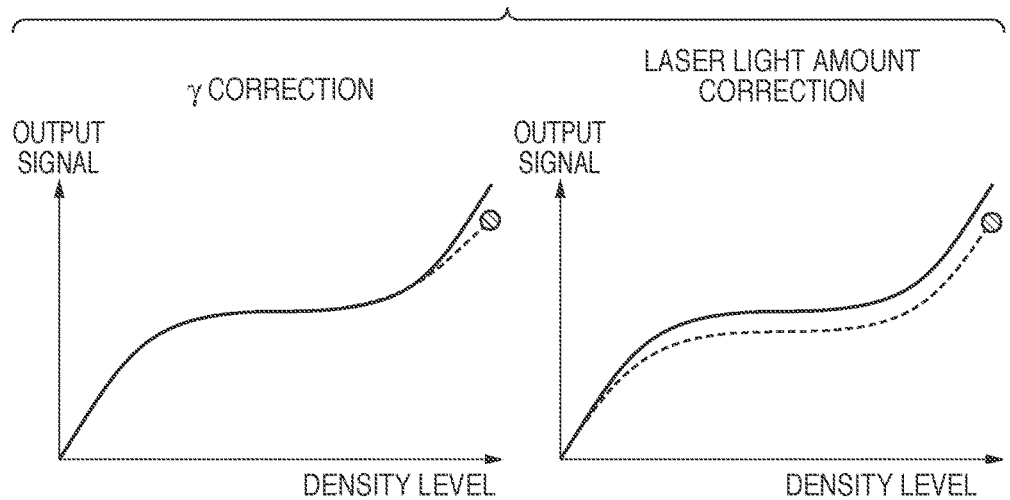
FIG. 4 is a graph conceptually showing the difference between the effect of using γ correction and that of using laser light amount correction as the second control system.

In laser light amount correction, no laser output signal can be individually corrected for each of low to high density levels, unlike γ correction. FIG. 4 is a graph conceptually showing the difference between the effect of using γ correction and that of using laser light amount correction as the second control system. The solid line indicates a density characteristic before correction, and the broken line indicates one after correction. FIG. 4 shows a case in which the density characteristic of an output image is corrected for the highest density level (image signal level). In this case, as shown in FIG. 4, γ correction can correct a laser output signal for only a target density level. In contrast, laser light amount correction changes not only the value of a laser output corresponding to a target density level, but also that of even a laser output corresponding to another density level. Hence, correcting a laser output signal of high density level by laser light amount correction affects even a tone in the half-tone region other than the high-density-level region, changing the tint of an output image.

In general, the human eye has high sensitivity to a change of the tint in the half-tone region. A change of the hue in the half-tone region especially attracts user attention. In the half-tone region, the tint can be adjusted at high precision by γ correction, but it is difficult to adjust the tint in the half-tone region at high precision by laser light amount correction. As described above, if the density characteristics are to be corrected by laser light amount correction for high density level, the tint changes even in the half-tone region.

To prevent this, the embodiment applies laser light amount correction targeting high density level to only a developing color lower in brightness than a predetermined value, such as black. As for the low-brightness color, the human eye has low sensitivity to a change of the tint. Even if laser light amount correction is done, only a change of the brightness attracts user attention. That is, when laser light amount correction is performed for the low-brightness color, density characteristics at high density level can be corrected to those capable of reducing degradation of the output image quality without substantially changing the tint of the output image.

Calibration processing in the embodiment will be explained in more detail. Calibration by the first control system to determine a reference density value to be used in the second control system will be described. Then, calibration by the second control system using the reference density value will be explained. Note that LUT_1 and LUT_2 corresponding to correction data and modification data (to be described later) in the first and second control systems are created for each of Y, M, C, and Bk.

<Calibration by First Control System>

Figure 5:
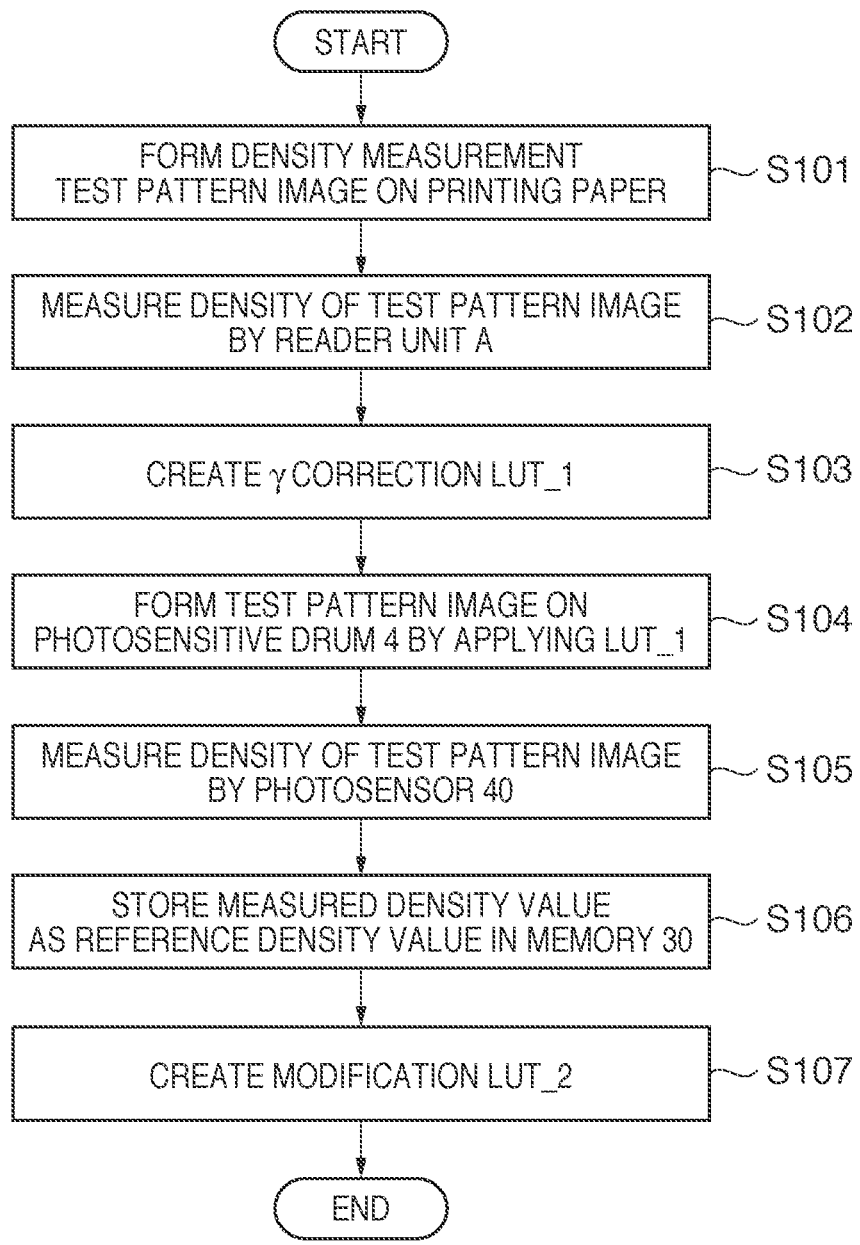
FIG. 5 is a flowchart showing the procedures of the first control system according to the first embodiment.

Calibration procedures by the first control system according to the embodiment will be described with reference to FIG. 5. In step S101, the CPU 28 generates a laser output signal for a test pattern image, and outputs it to the exposure unit of the printer engine unit 110. The exposure unit of the printer engine unit 110 exposes the photosensitive drum 4 in accordance with the laser output signal, forming the latent image of the test pattern image on the photosensitive drum 4. The latent image formed on the photosensitive drum 4 is developed into a toner image, and the toner image is transferred onto printing paper. The fixing unit 6 fixes the toner image onto the printing paper, and the printing paper is discharged outside the apparatus. This printing paper will be called test printed paper.

The test pattern image includes a plurality of patch images different in density. The test pattern image allows measuring the density value of an output image when an image having a plurality of tone levels (density levels) is an input image. The test pattern image can be formed from a total of 4 (columns)×16 (rows) gradation patch images corresponding to 64 tone levels for each of Y, M, C, and Bk, as disclosed in, for example, Japanese Patent Laid-Open No. 2000-238341. Note that the test pattern image may be stored in advance in the memory 30 and used by reading it out by the CPU 28.

The reader unit A reads the test printed paper bearing the test pattern image. In step S102, the CPU 28 acquires the image signal of the test pattern image on the test printed paper from the reader unit A, and measures a density value at a predetermined position in each patch image. For example, the CPU 28 may obtain density values at 16 measurement positions from every patch image, average the 16 density values obtained from the respective measurement positions, and use the average as the density value of the patch image.

In step S103, based on the correspondence between density values measured from the respective patch images and laser output signals used to form the respective patch images, the CPU 28 creates LUT_1 corresponding to correction data to be used in γ correction for correcting the density characteristics of an image to be formed on printing paper. For example, LUT_1 is the inverse function of a function indicating the correspondence between density values at respective density levels and laser output signals. By converting the density of an input image into a laser output signal based on LUT_1, the densities and tones of the input and output images substantially coincide with each other. The CPU 28 stores the created LUT_1 in the memory 30. Note that the memory 30 is an example of a storage unit.

In step S104 and subsequent steps, a reference density value in calibration by the second control system is determined using LUT_1 created in step S103. In step S104, the CPU 28 generates a laser output signal for the test pattern image using LUT_1, and outputs it to the exposure unit. The exposure unit forms the latent image of the test pattern image on the photosensitive drum 4 in accordance with the laser output signal. The latent image formed on the photosensitive drum 4 is developed into a toner image. However, transfer of the toner image onto printing paper is not executed. In step S105, the CPU 28 controls the photosensor 40 to measure the density value of each patch image contained in the toner image formed on the photosensitive drum 4. In step S106, the CPU 28 stores the measured density value as a reference density value in the memory 30.

Finally in step S107, in accordance with the amount of change, from the reference density value stored in the memory 30, of the density value measured for the toner image formed on the photosensitive drum 4, the CPU 28 creates LUT_2 for modifying the density correction characteristics of LUT_1. More specifically, LUT_2 is used as modification data for modifying an image signal value having undergone γ correction using LUT_1 in accordance with the amount of change of a measured density value from the reference density value. Note that LUT_2 created in step S107 serves as the initial value of LUT_2 to be created (updated) in the second control system (to be described later). LUT_2 determined in the first control system generally has a linear characteristic such as y=x. The LUT_1, LUT_2, and reference density value are held in the nonvolatile memory 30, and used for calibration by the second control system and normal image printing.

<Calibration by Second Control System>

Figure 6:
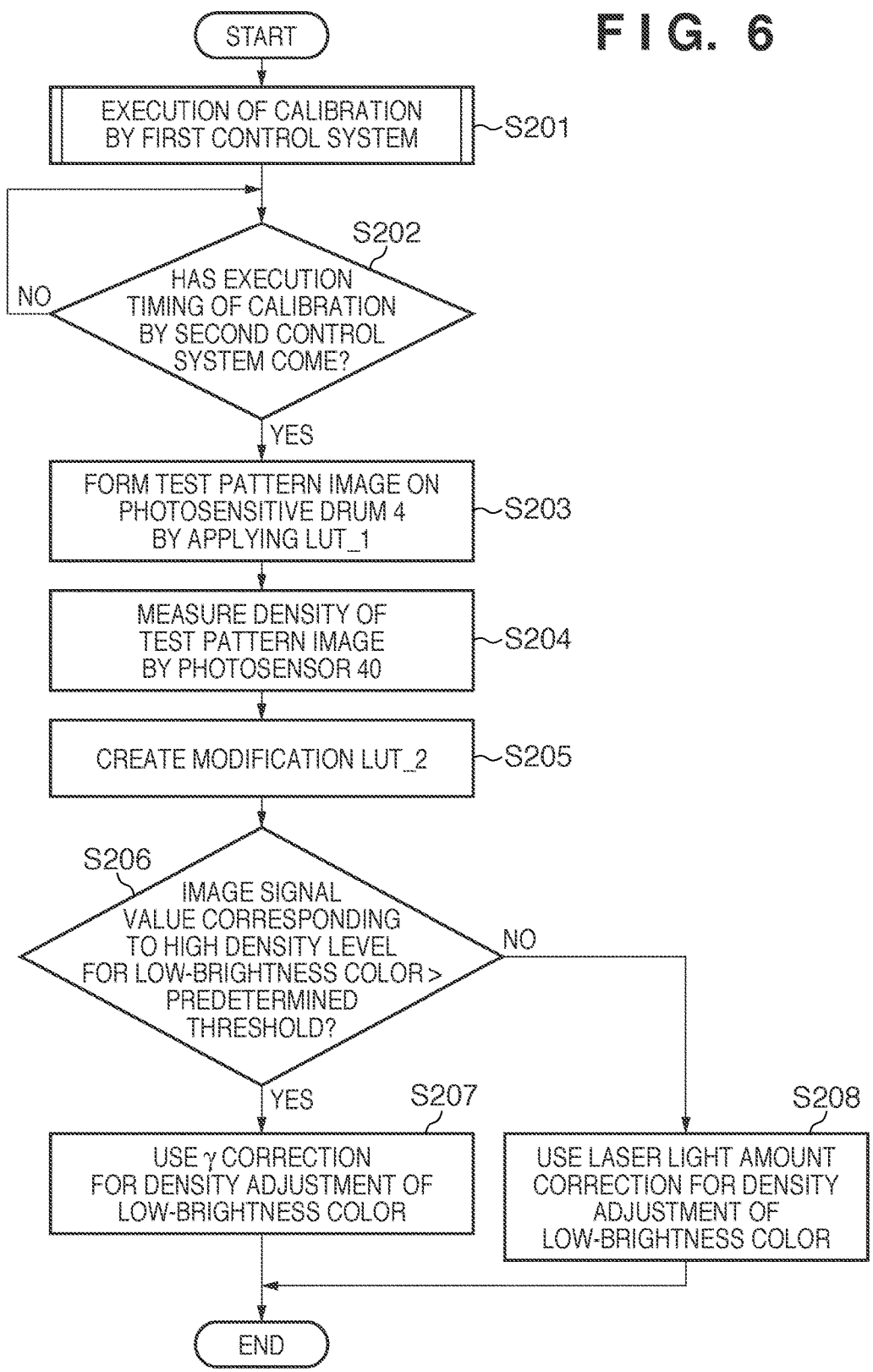
FIG. 6 is a flowchart showing the procedures of calibration (first and second control systems) according to the first embodiment.

In the embodiment, the second control system executes calibration at a predetermined time after execution of the first control system, as described above. Calibration procedures by the second control system will be described with reference to FIG. 6. The embodiment assumes black (Bk) as a low-brightness developing color to which the second control system applies laser light amount correction. However, as for developing colors other than Bk, a developing color relatively low in brightness may undergo laser light amount correction. In particular, at least one of black (Bk), magenta (M), and cyan (C) can undergo laser light amount correction.

In step S201, the CPU 28 executes a series of processes described with reference to FIG. 5 as calibration by the first control system. This calibration by the first control system can be executed at an interval longer than the execution interval of calibration by the second control system in, for example, installation work of an image forming apparatus or periodic inspection work by a serviceman. When a predetermined execution time has come, the CPU 28 executes calibration by the second control system in step S202 and subsequent steps.

In step S202, the CPU 28 determines whether the predetermined execution time of the calibration by the second control system has come. The predetermined execution time is, for example, at power-on of the image forming apparatus, once a day, or at every printing of a predetermined number of sheets. If the CPU 28 determines in step S202 that the predetermined execution time has not come, it repeats the determination processing in step S202. If the CPU 28 determines that the predetermined execution time has come, it shifts the process to step S203.

In step S203, the CPU 28 applies γ correction using LUT_1 to generate a laser output signal for a test pattern image and output it to the exposure unit. The exposure unit forms the latent image of the test pattern image on the photosensitive drum 4 in accordance with the laser output signal. The latent image formed on the photosensitive drum 4 is developed into a toner image. However, transfer of the toner image onto printing paper is not executed. In this way, the CPU 28 functions as a pattern forming unit.

In step S204, the CPU 28 controls the photosensor 40 to measure the density value of each patch image contained in the toner image formed on the photosensitive drum 4. In step S205, in accordance with the amount of change of the density value measured in step S204 from the reference density value stored in the memory 30, the CPU 28 creates (updates) LUT_2 for modifying the density correction characteristics of LUT_1. As described above, LUT_2 is used as modification data for modifying an image signal value having undergone γ correction using LUT_1 in accordance with the amount of change of a measured density value from the reference density value. Thereafter, the process shifts to step S206.

In steps S206 and S207, laser light amount correction is used instead of γ correction using LUT_2 when the character or line quality may degrade due to a decrease in laser output signal value at high density level in the density correction characteristics based on LUT_1 and LUT_2. In step S206, the CPU 28 determines whether a laser output signal value (image signal value) corresponding to a predetermined high density level exceeds a predetermined threshold (first threshold) in the density correction characteristics of the low-density developing color (Bk) based on LUT_1 and LUT_2. If the laser output signal value exceeds the first threshold ("YES" in step S206), the CPU 28 shifts the process to step S207. If the laser output signal value is less than or equal to the first threshold ("NO" in step S206), the CPU 28 shifts the process to step S208.

The predetermined high density level in step S206 suffices to be a density level capable of evaluating degradation of the character or line quality caused by a decrease in laser output signal value. For example, the predetermined high density level suffices to be a density level serving as a criterion which determines a maximum density in the density characteristics of an output image. In this case, the predetermined high density level corresponds to, for example, the above-mentioned image density of 1.6. The first threshold can be determined in advance in accordance with the specifications of the copying apparatus 100. More specifically, the first threshold can be determined by pre-evaluation regarding the presence/absence of a jaggy in an output image when the laser output signal value is changed. For example, generation/no generation of a jaggy in an output image (especially a line portion) is evaluated for a plurality of laser output signal values, and the allowable range of quality degradation is finalized for the laser output signal value. Further, the smallest laser output signal value in the finalized allowable range is determined as the first threshold.

Figure 7:
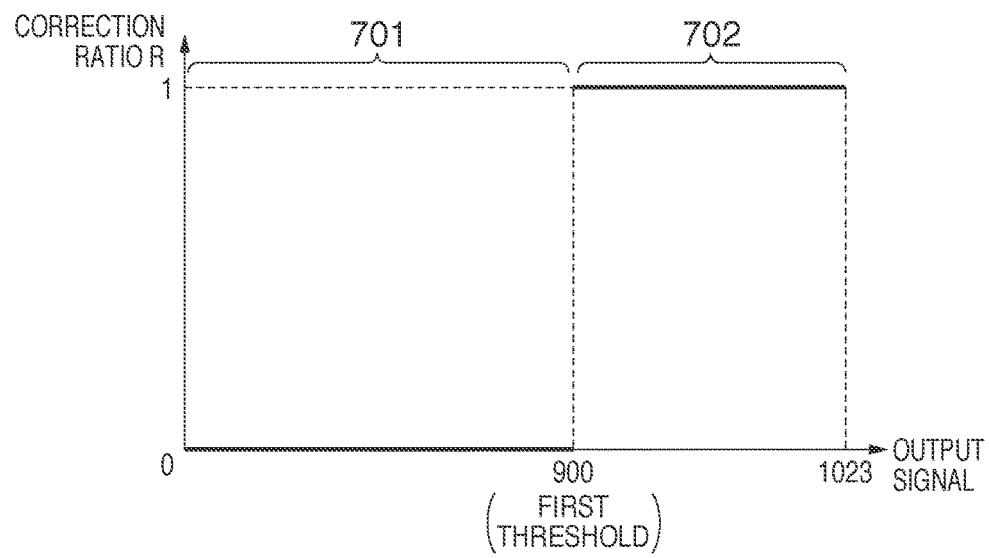
FIG. 7 is a graph showing the correction ratio between γ correction and laser light amount correction in the second control system according to the first embodiment.

FIG. 7 shows the relationship between the first threshold and switching between γ correction and laser light amount correction. Note that the correction ratio R is defined as a ratio at which γ correction is used with respect to the Bk density correction characteristic. R=1 corresponds to the use of only γ correction, and R=0 corresponds to the use of only laser light amount correction. In FIG. 7, the first threshold is 900. As shown in FIG. 7, if the laser output signal value corresponding to the predetermined high density level for Bk falls within a range 702 larger than the first threshold (900) ("YES" in step S206), γ correction is used for the Bk density correction characteristic without changing the correction method (step S207). If the laser output signal value corresponding to the predetermined high density level for Bk falls within a range 701 less than or equal to the predetermined threshold ("NO" in step S206), the correction method regarding the Bk density correction characteristic is switched from $\gamma$ correction to laser light amount correction (step S208).

In step S207, the CPU 28 performs $\gamma$ correction using LUT_1 created in step S103 and LUT_2 created in step S205 for density adjustment of the low-brightness developing color (Bk) and even colors (M, C, and Y) other than the low-brightness developing color. In other words, the CPU 28 does not switch from $\gamma$ correction to laser light amount correction for Bk. In this fashion, the CPU 28 functions as a correction unit.

In step S208, the CPU 28 performs $\gamma$ correction using LUT_1 created in step S103 for density adjustment of the low-brightness developing color (Bk) in normal image formation. In addition, the CPU 28 adopts laser light amount correction instead of $\gamma$ correction using LUT_2 created in step S205. The CPU 28 determines the correction amount of the exposure amount in laser light amount correction based on the amount of density change from the reference density value obtained in step S205 for the predetermined high density level.

Figure 8:
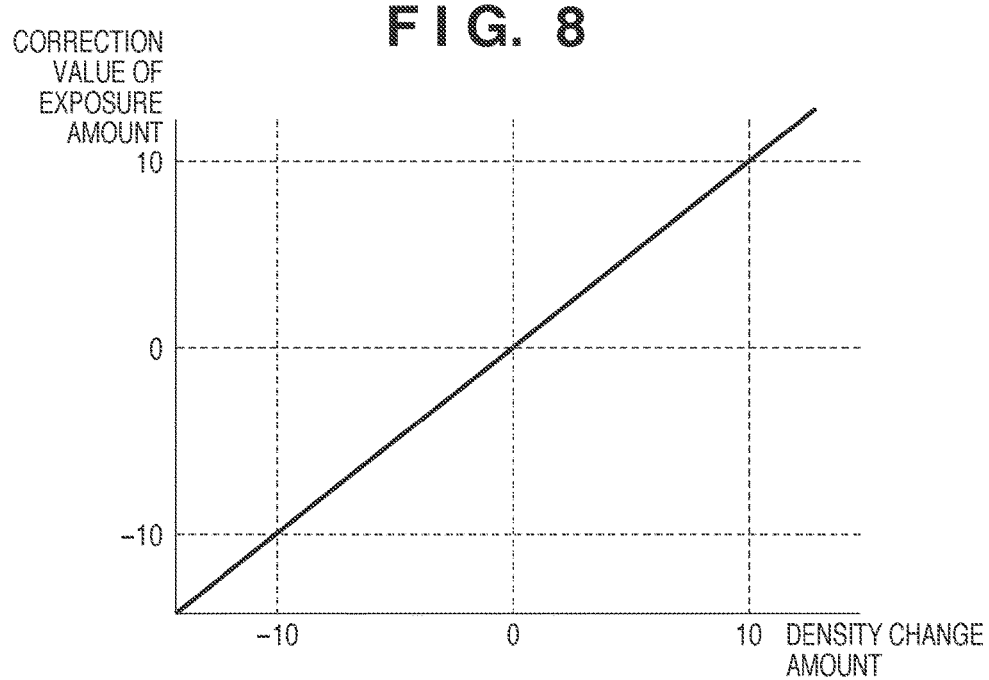
FIG. 8 is a graph showing the relationship between the amount of density change from a reference density value and the correction amount of the light amount in laser light amount correction according to the first embodiment.

The correction amount of the exposure amount in laser light amount correction can be determined in advance in correspondence with the density change amount in accordance with the specifications of the copying apparatus 100. More specifically, a correction amount is determined for correcting the exposure amount of the laser light source 20 to an exposure amount at which the density change amount is compensated in correspondence with the amount of density change from the reference density value and the density value of an output image takes the reference density value. FIG. 8 exemplifies the correspondence between a density change amount for a predetermined high density level and the correction amount of the exposure amount in laser light amount correction. It suffices to store, in the memory 30 in advance, light amount correction data containing the correspondence. The CPU 28 performs laser light amount correction at a correction amount (ordinate axis) corresponding to a density change amount (abscissa axis) using the light amount correction data stored in the memory 30. In FIG. 8, the density change amount=0 indicates no change from the reference density value. In this case, the correction amount of the exposure amount=0, and the exposure amount of the laser light source 20 is not corrected.

In step S208, the CPU 28 exposes the photosensitive drum 4 at an exposure amount corrected by the correction amount determined in the above way for Bk in normal image formation. Also, in normal image formation, the CPU 28 performs $\gamma$ correction using LUT_1 created in step S103 and LUT_2 created in step S205 for colors (M, C, and Y) other than the low-brightness developing color. After the processing in step S207 or S208, a series of calibration procedures finally ends.

As described above, in accordance with the amount of change, from the reference density value, of a density value measured from a test pattern image formed on the photosensitive drum, the image forming apparatus according to the first embodiment creates LUT_2 for correcting a laser output signal value corrected using the $\gamma$ correction LUT_1. The image forming apparatus executes $\gamma$ correction using LUT_1 and LUT_2 for developing colors other than a predetermined low-brightness developing color. As for the predetermined low-brightness developing color, when a laser output signal value corresponding to a predetermined high density level after $\gamma$ correction using the two LUTs becomes less than or equal to the first threshold, laser light amount correction is performed in place of $\gamma$ correction using LUT_2.

The first embodiment can, therefore, maintain the stability of the density characteristics of an output image by applying calibration based on $\gamma$ correction using LUT_1 and LUT_2, and calibration based on $\gamma$ correction using LUT_1 and laser light amount correction. When a laser output signal value corresponding to high density level for a low-brightness developing color may decrease due to calibration, which is a cause of degradation of the character or line quality, laser light amount correction can reduce degradation of the character or line quality. Further, degradation of the line quality can be reduced by simple processing of correcting the exposure amount by laser light amount correction without applying line width control or the like using additional hardware.

Second Embodiment

In the first embodiment, either $\gamma$ correction or laser light amount correction is used for a low-brightness developing color based on the comparison between a laser output signal value corresponding to a predetermined high density level and the first threshold. In the second embodiment, the use of $\gamma$ correction and laser light amount correction is not selectively switched, but both of them are used in accordance with a predetermined correction ratio in the boundary region of a laser output signal value where the character or line quality may degrade. Compared to the first embodiment, the second embodiment tries to further reduce degradation of the line quality in an output image while maintaining the stability of the density characteristics of the output image. Note that a description of a part common to the first embodiment will not be repeated for descriptive convenience.

Figure 9:
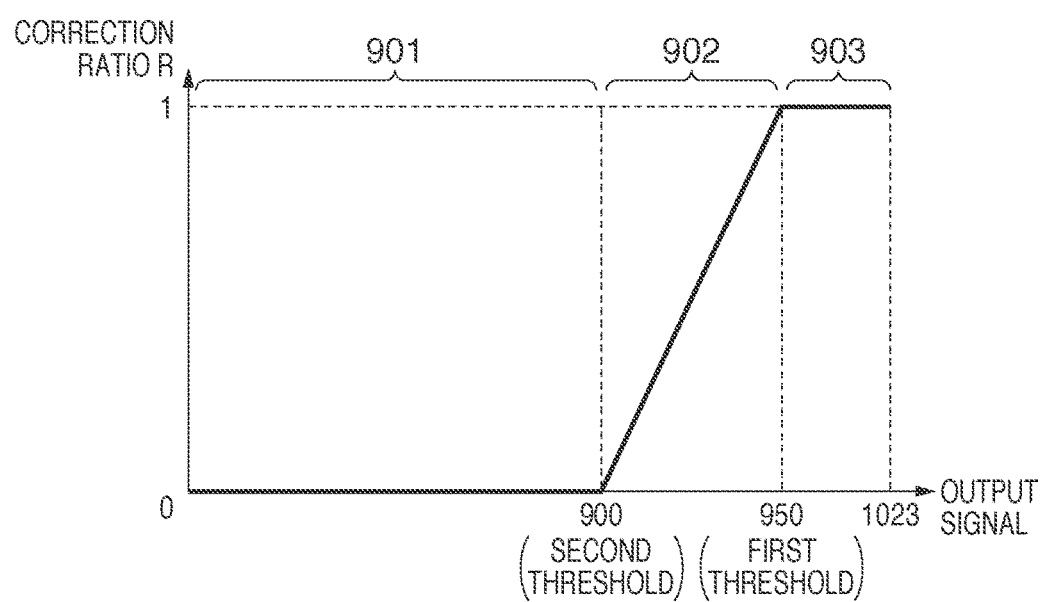
FIG. 9 is a graph showing the correction ratio between γ correction and laser light amount correction in the second control system according to the second embodiment.

FIG. 9 exemplifies the correction ratio R between $\gamma$ correction and laser light amount correction in the second control system according to the second embodiment. Similar to FIG. 7, the correction ratio R is defined as a ratio at which $\gamma$ correction is used with respect to the Bk density correction characteristic. R=1 corresponds to the use of only $\gamma$ correction, and R=0 corresponds to the use of only laser light amount correction. As shown in FIG. 9, both $\gamma$ correction and laser light amount correction are used in accordance with the correction ratio R in the boundary region (range 902 between the first and second thresholds) of the laser output signal value where a character or line may be jagged. In FIG. 9, for example, the correction ratio R in the range 902 is defined as a ratio at which the correction amount by laser light amount correction with respect to the correction amount by $\gamma$ correction and laser light amount correction increases as the laser output signal value decreases. For example, for R=0.4, laser light amount correction is executed in accordance with a density change amount obtained by multiplying the amount of change of a measured density value from the reference density value by R=0.4. Also, $\gamma$ correction is executed in accordance with a density change amount obtained by multiplying the amount of change of a measured density value from the reference density value by 1−R=0.6. Note that the first and second thresholds are determined by pre-evaluation regarding the presence/absence of a jaggy in an image finally formed on printing paper, similar to the first threshold in the first embodiment.

Figure 10:
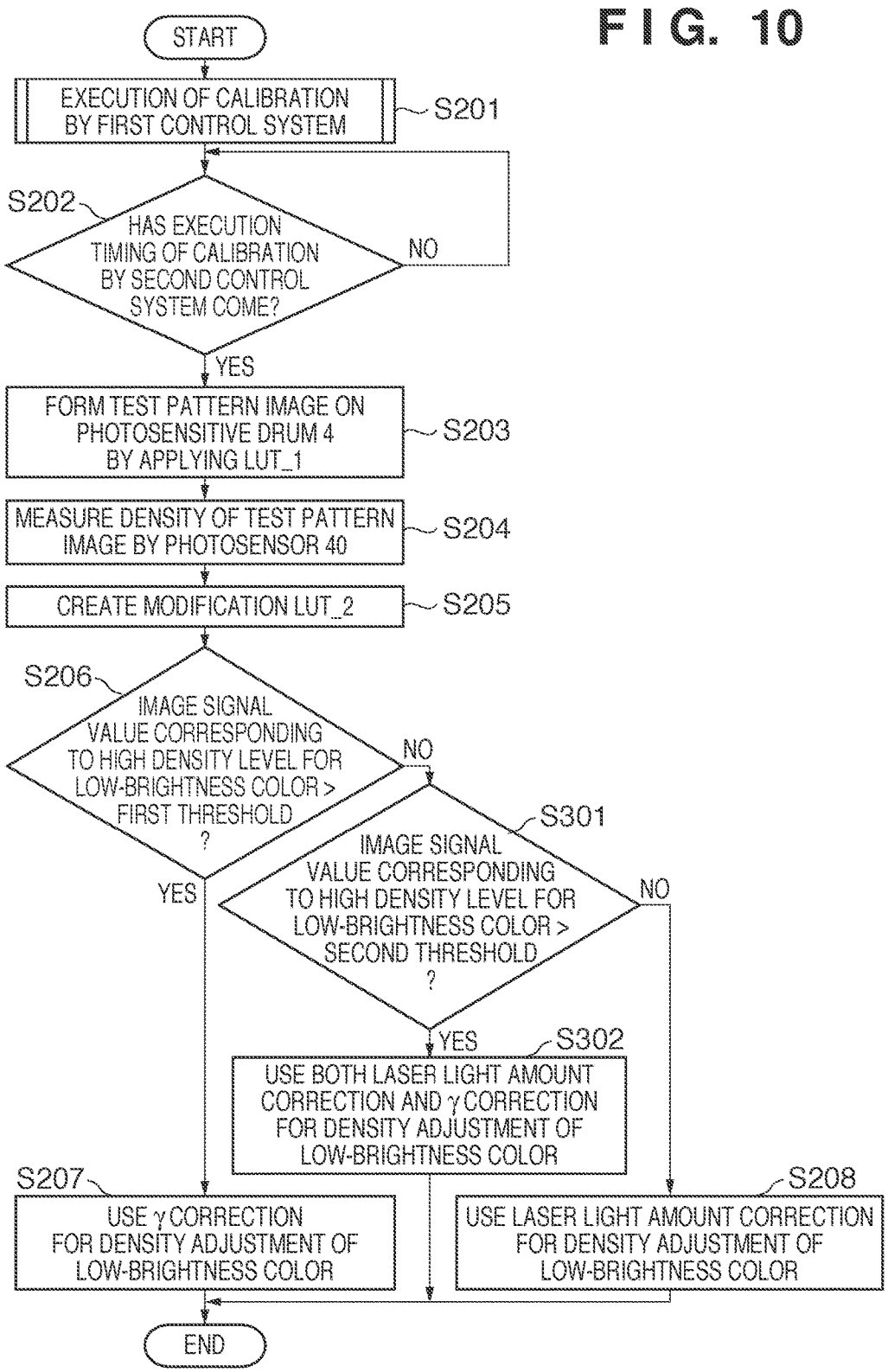
FIG. 10 is a flowchart showing the procedures of calibration (first and second control systems) according to the second embodiment.

Calibration by the second control system according to the second embodiment will be explained with reference to the flowchart of FIG. 10. In FIG. 10, the same reference numerals (steps S201 to S208) denote the same processes as those in the first embodiment (FIG. 6), and a description thereof will not be repeated as much as possible for descriptive convenience.

In the second embodiment, the process shifts to determination processing in step S206 after creation of LUT_2 in step S205, similar to the first embodiment. In steps S206 and S301, a CPU 28 compares a laser output signal value corresponding to a predetermined high density level after γ correction using LUT_1 and LUT_2 with predetermined first and second thresholds. From the comparison, the CPU 28 determines which of ranges 901 to 903 shown in FIG. 9 contains the laser output signal value. First in step S206, the CPU 28 determines whether the laser output signal value (image signal value) corresponding to the predetermined high density level for Bk is larger than the first threshold. If the laser output signal value is larger than the first threshold ("YES" in step S206), the CPU 28 shifts the process to step S207. In step S207, the CPU 28 performs γ correction using LUT_1 and LUT_2 for all the developing colors without switching to laser light amount correction in normal image formation, similar to the first embodiment. If the CPU 28 determines in step S206 that the laser output signal value is less than or equal to the first threshold ("NO" in step S206), it shifts the process to step S301.

In step S301, the CPU 28 determines whether the laser output signal value corresponding to the predetermined high density level for Bk is larger than the second threshold. If the laser output signal value is larger than the second threshold ("YES" in step S301), the CPU 28 determines that the laser output signal value falls within the range 902 of FIG. 9, and shifts the process to step S302. If the CPU 28 determines in step S301 that the laser output signal value corresponding to the predetermined high density level for Bk is less than or equal to the second threshold ("NO" in step S301), it shifts the process to step S208. In step S208, for density adjustment of Bk in normal image formation, the CPU 28 performs γ correction using LUT_1, and adopts laser light amount correction instead of γ correction using LUT_2, similar to the first embodiment.

In step S302, for density adjustment of Bk in normal image formation, the CPU 28 executes γ correction using LUT_1, and also performs both γ correction using LUT_2 and laser light amount correction in accordance with the correction ratio R corresponding to the laser output signal value, as described above. As for developing colors (M, C, and Y) other than Bk, the CPU 28 performs γ correction using LUT_1 and LUT_2. After that, a series of calibration procedures according to the second embodiment ends.

As described above, the image forming apparatus according to the second embodiment uses both γ correction and laser light amount correction in the boundary region of a laser output signal value where the character or line quality may degrade. In this fashion, the second embodiment can use both γ correction and laser light amount correction at a ratio corresponding to the degree of degradation of the character or line quality in the boundary region. Compared to the first embodiment, the second embodiment can further reduce degradation of the character or line quality in an output image while maintaining the stability of the density characteristics of the output image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-112665, filed May 14, 2010, which is hereby incorporated by reference herein in its entirety.

What is claimed is:

1. An image forming apparatus comprising:
an image processor configured to convert an image signal based on a tone correction table indicating a relationship between a level of the image signal and an output signal value;
a printer configured to form an image based on the converted image signal;
a sensor configured to measure a pattern image formed by the printer;
a controller, including a processor, configured to execute:
a pattern image forming task that controls the printer to form the pattern image;
a measuring task that controls the sensor to measure the pattern image;
a generating task that generates the tone correction table based on a measurement result from the measuring task;
an obtaining task that obtains a reference output signal value corresponding to a high density level of the image signal based on the tone correction table generated by the generating task; and
a controlling task that controls, based on the reference output signal value obtained by the obtaining task an image forming condition for adjusting a maximum density of an output image to be formed by the printer.

2. The image forming apparatus according to claim 1, wherein the controller is further configured to execute a setting task that:
in a case where the reference output signal value is not lower than a threshold value, sets the generated tone correction table as an updated tone correction table; and
in a case where the reference output signal value is lower than the threshold value, sets another lookup tone correction table as the updated tone correction table.

3. The image forming apparatus according to claim 1, wherein the high density level corresponds to a maximum density level.

4. The image forming apparatus according to claim 1, wherein the high density level enables evaluation of degradation in character image quality and line image quality.

5. The image forming apparatus according to claim 1, wherein:
the printer comprises a photosensitive member, an exposure unit configured to expose the photosensitive unit with a laser beam to form an electrostatic latent image, and a developing unit configured to develop the electrostatic latent image on the photosensitive member, and
the image forming condition is a laser power of the laser beam.

6. The image forming apparatus according to claim 1, wherein:
the printer comprises an image carrier, and a transfer unit configured to transfer the image formed on the image carrier to a recording medium, and
the sensor measures the pattern image formed on the image carrier by the printer.

7. A method of controlling an image forming apparatus that comprises an image processor configured to convert an image signal based on a tone correction table indicating a relationship between a level of the image signal and an output signal value, a printer configured to form an image based on the converted image signal, and a sensor configured to measure a pattern image formed by the printer, the method comprising the steps of:

forming the pattern image using the printer;

measuring the pattern image with the sensor;

generating the tone correction table based on a measuring result from the measuring step;

obtaining a reference output signal value corresponding to a high density level of the image signal based on the tone correction table generated in the generating step; and controlling, based on the reference output signal value, an image forming condition for adjusting a maximum density of an output image to be formed by the printer.

8. The image forming apparatus according to claim 1, wherein, in a case where the reference output signal value is lower than a threshold value, the controlling task changes the image forming condition.

9. The image forming apparatus according to claim 1, wherein:

the controller is further configured to execute:

a printing task that prints a measurement image on a sheet; and a pre-generation task that generates a base tone correction table based on read data for the measurement image, the read data being output from a reader, and the generating task generates the tone correction table based on the base tone correction table and the measuring result from the measuring task.

10. The image forming apparatus according to claim 1, wherein:

the controller is further configured to execute a determining task that:

in a case where the reference output signal value is lower than a threshold value, determines a first tone correction table as the tone correction table to be used by the image processor, and in a case where the reference output signal value is not lower than the threshold value, determines a second tone correction table as the tone correction table to be used by the image processor, the generating task generating the second tone correction table.

11. The method of controlling an image forming apparatus according to claim 7, wherein, in a case where the reference output signal value is lower than a threshold value, the controlling task changes the image forming condition.

12. The method of controlling an image forming apparatus according to claim 7, wherein the high density level corresponds to a maximum density level of the image signal.

* * * * *